INVENTOR.
Theodore C. Melim, Jr.

Aug. 27, 1963  T. C. MELIM, JR  3,101,509
PRODUCTION OF CAMELBACK RIBBON
Filed Oct. 23, 1961  2 Sheets-Sheet 2

INVENTOR.
Theodore C. Melim Jr.
BY
Townsend and Townsend
Attorney

3,101,509
PRODUCTION OF CAMELBACK RIBBON
Theodore C. Melim, Jr., Honolulu, Hawaii, assignor to Melim, Ltd., Honolulu, Hawaii
Filed Oct. 23, 1961, Ser. No. 146,811
5 Claims. (Cl. 18—2)

This invention relates to rubber processing and, more particularly, relates to apparatus and a method for making camelback ribbon from rubber after it has been mixed from the basic ingredients used in the processing of rubber.

A principal object of this invention is to provide apparatus and a method for making camelback ribbon of any desired size and shape directly from the rubber as it occurs after mixing.

A more specific object of this invention is to provide a method and apparatus to form camelback ribbon directly from a conventional rubber mill without the use of extrusion means. The consequent economic advantages over known methods of forming camelback ribbon are enormous. For example, capital expenditure is minimized and space requirements for equipment, processing, and storage are relatively small.

Further objects, features, and advantages of the invention will become apparent upon reading the following detailed specification in conjunction with the drawings, in which.

Figure 1:
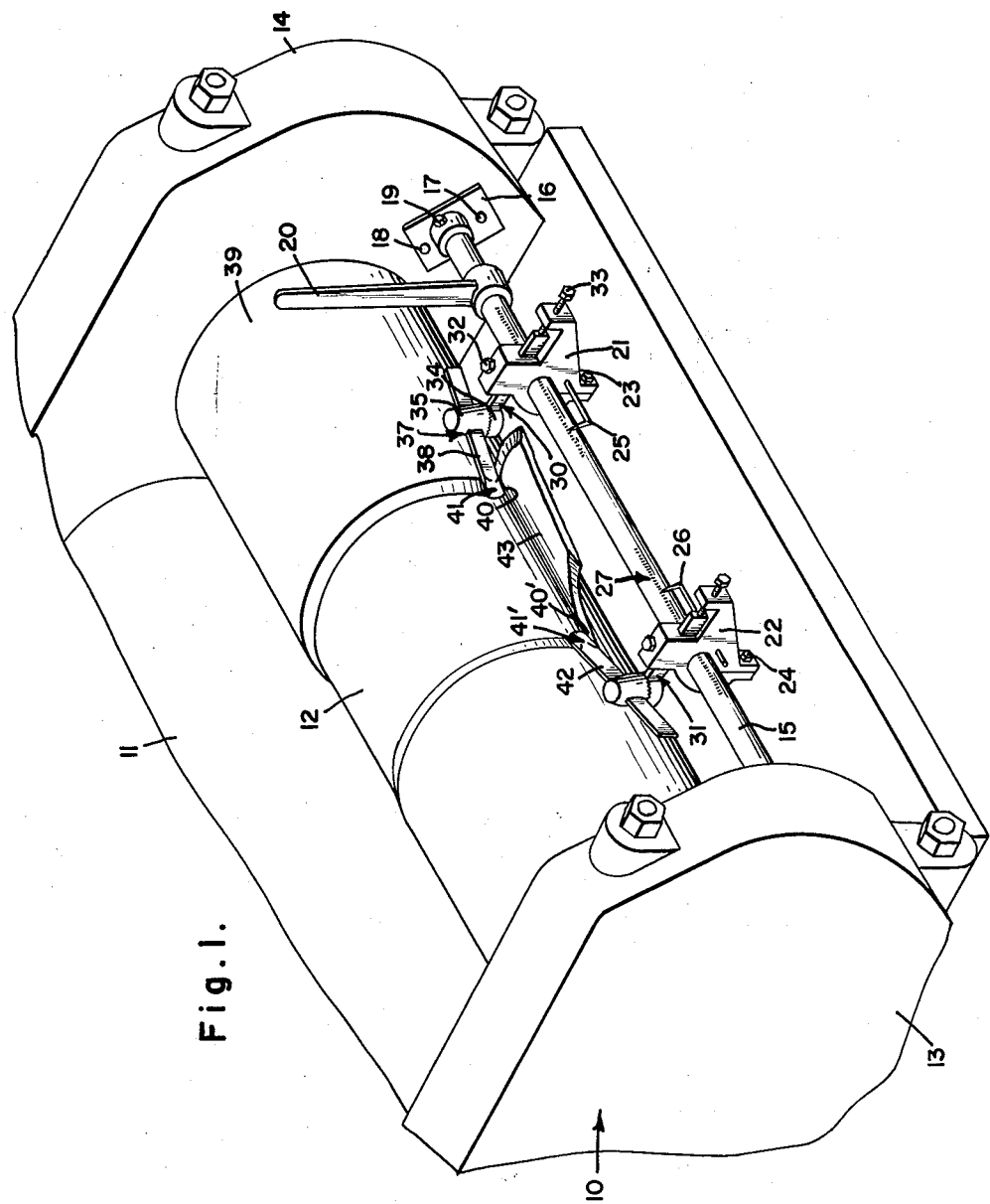
FIG. 1 shows in perspective a portion of a conventional rubber mixing mill showing the terminal roll and the attachment provided by the present invention.
Figure 2:
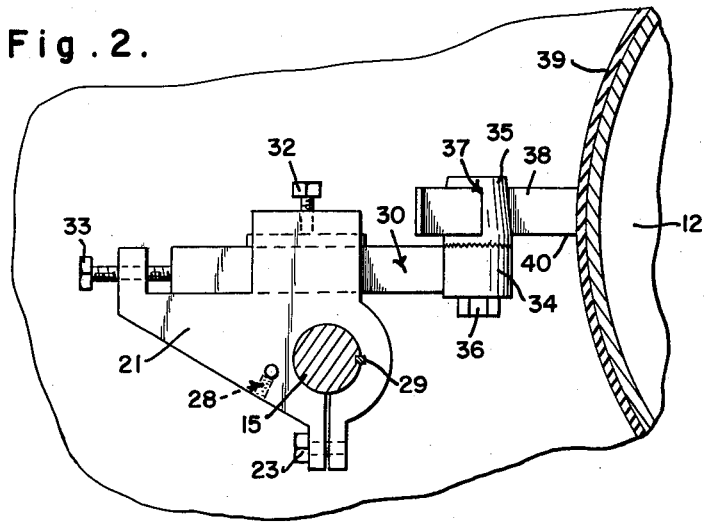
FIG. 2 shows in side section taken along the line 2—2 of FIG. 1 a portion of the terminal roll of the mixing mill and the attachment provided by the present invention.
Figure 3:
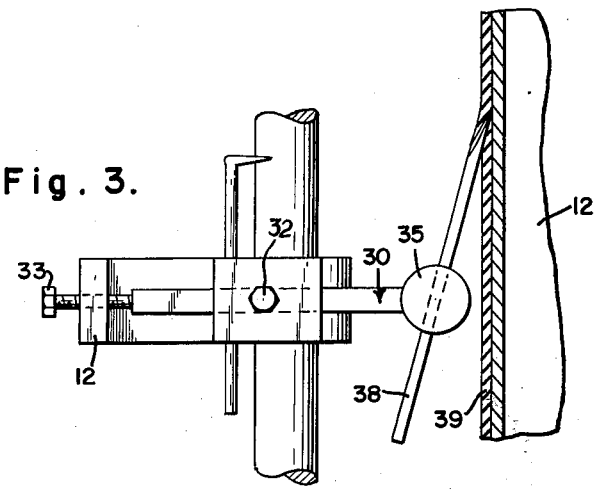
FIG. 3 shows in top elevation the portion of the roll and the attachment shown in FIG. 2.

The term "camelback ribbon" as used throughout this specification and claims refers to strips of rubber used in making tread caps in the retreading of automobile tires and the like as it is customarily used in the trade. The ribbon has a generally trapezoidal cross section.

Rubber processing comprises a generally accepted sequence of steps or operations. The first step in processing or making rubber such as that suitable for recapping tires is compounding. This includes weighing the various ingredients required by the formula for the particular type of rubber desired. This involves the selection of the rubber, rubber chemicals (accelerators and antioxidants), the reinforcing pigments or fillers, and the processing aids. A typical recipe for passenger car tire tread is as follows:

Table

| Ingredients: | Relative number of parts by weight |
| --- | --- |
| SBR–1502 [1] | 100 |
| HAF carbon black [2] | 50 |
| Processing oil | 8 |
| Zinc oxide | 3 |
| Sulfur | 1.75 |
| Accelerator | 1.0 |
| Antioxidant | 1.0 |

[1] A butadiene-styrene copolymer polymerized at 5° C. (a cold rubber).
[2] HAF, high-abrasion furnace.

The next step in rubber making is mixing. This step accomplishes an intimate and homogeneous mix of the ingredients required by the recipe such as shown above. The mixing operation is suitably carried out on a rubber mixing mill having two or more rolls, although other types of apparatus are also used for mixing.

After mixing, the next step is forming. Forming operations usually involve either extrusion of the rubber into the desired shape, or calendering the rubber to sheet the material to some specified gage or to apply a sheet of the material to a fabric.

Following forming, a building operation may be employed depending on the product being made. This step is necessary where different stocks of rubber must be combined or rubber stocks are to be combined with other materials of construction.

The final step is vulcanization. It follows the building operation, or in the event that no building operations are involved, the forming operation. This is the process which converts the essentially plastic, raw mixture to an elastic state. It is normally accomplished by applying heat for a specified time at the desired level.

Heretofore, in the tire recapping industry, operators purchased tread capping in a boxed, pre-shaped form which was ready for application to the tire carcass to be retreaded. This method of operation is very costly and has more recently given way to a trend toward forming the tread to the necessary configuration from rubber obtained directly from the producer by extrusion, thereby eliminating the rubber manufacturer. In place of purchasing the tread rubber in pre-shaped form, the newer approach is to obtain rubber compounds in slabs, about ⅜" thick and 30" square. This rubber has been processed through the compounding and mixing steps described above.

These sheets of rubber are pre-heated and then extruded into the desired die size just prior to applying them to the buffed casing. The rubber is extruded into a winged die shape, i.e. it has a generally trapezoidal cross section and is thereby of suitable shape for applying to the tire casing for the recapping thereof.

This new approach has several disadvantages. It is necessary to control the accuracy of the die size used for extruding the rubber. It is essential to utilize carefully made dies and to be consistent in the extrusion to obtain the right amount of tread rubber placed in the right parts of the casing. An even greater practical disadvantage to this newer approach is the cost of the extruder needed to produce the camelback ribbon having the requisite configuration.

The present invention avoids the foregoing disadvantages by eliminating the necessity for an extruder. Broadly, the present invention provides apparatus for making camelback ribbon comprising, in combination, a rubber mixing mill, and means cooperating with said mill for cutting camelback ribbon adjacent to the surface of a roll of the mill from rubber thereon.

In a specific embodiment, the present invention provides an adjustable attachment for a rubber mixing mill for cutting wing die shaped camelback ribbon therefrom. The attachment is adapted to be used in combination with a rubber mixing mill having a plurality of rolls.

The attachment comprises an arbor mounted on the mill parallel to and relatively closely spaced from the terminal roll thereof. A pair of cutting fixtures are slidably mounted on the arbor for positioning along the arbor at preselected points.

Means are provided for holding the fixtures at the preselected points; there is a tool holder cooperating with each fixture and releasably locked thereto. The tool holder is movable toward and away from the terminal roll when released from said fixture.

A knife is supported by part of each tool holder and each knife is oriented toward the surface of the terminal roll. The part of each tool holder supporting the knives is rotatable with respect to the remainder of each tool holder whereby the inclination of each blade with respect to the longitudinal axis of the terminal roll may be varied.

In addition, the tool holders are adapted to support the knives so that the longitudinal axes of the knives are perpendicular to a tangent to the terminal roll.

The attachment of the present invention is designed to be used in cooperation with a rubber mixing mill and comes into play in the accepted sequence of rubber processing following the mixing step. The attachment is used to execute the forming step. It eliminates the need for an extruder or equivalent device in making camelback ribbon. The remaining rubber processing steps in retreading remain unchanged.

Suitably, the rubber mill may be used to actually mix the compounded ingredients of the rubber. Alternatively, previously mixed rubber may be fed into the rubber mill and be acted upon by the present attachment.

Turning to the drawings, the preferred embodiment shown includes a rubber mill shown generally at 10 having roll 11 and terminal roll 12 rotatably mounted therein. The mill includes side frame members 13, 14.

An arbor 15 is mounted between frame members 13, 14 relatively closely spaced from and parallel to terminal roll 12. Arbor 15 is mounted on frame member 14 by trunnion pad 16 suitably fixed to frame member 14 by bolts 17, 18. Arbor 15 nests within trunnion pad 16 and is clamped by set screw 19 acting on an interior friction block (not shown). The other end of arbor 15 is mounted on frame member 13 by a similar device (not shown). Arbor 15 may be rotated within trunnion pad 16 by means of handle 20 to activate and stop the cutting means to be described.

A pair of cutting fixtures 21, 22 are slidably mounted on arbor 15 for lateral positioning therealong at preselected points. The distance between fixtures 21, 22 may thereby be any amount desired. Fixtures 21, 22 are releasably locked in place on arbor 15 by means of bolts 23, 24 respectively.

Fixtures 21, 22 include laterally extending width gage rods 25, 26 respectively. By suitably etching distance marks as at 27, the position on arbor 15 that is desired is readily determined.

Set screw 28 holds the gage rod 25 in appropriate relation to the fixture 21. An alignment key 29 serves to maintain fixture 21 in desired upright relation to the arbor 15 and roll 12. Similar parts (not shown) are present on fixture 22.

Slidably mounted on top of fixtures 21, 22 are tool holders 30, 31 respectively. Tool holder 30 is releasably clamped in desired position by clamp screw 32. Sliding tool holder 30 in and out of fixture 21 permits movement of tool holder 30 toward and away from terminal roll 12. The precise distance from roll 12 may be set by turning tool adjust screw 33 clockwise or counterclockwise as required. Corresponding parts are present on tool holder 31.

The protruding end of tool holder 30 adjacent to roll 12 comprises a cylinder 34 abutting with a frusto-conical member 35. Member 35 is rotatable with respect to cylinder 34 and the remainder of tool holder 30 about a threaded shaft (not shown) extending interiorly of cylinder 34 and member 35. Member 35 may be releasably locked in place to cylinder 34 by tightening nut 36 at the bottom end of the interior threaded shaft. Corresponding parts are present on tool holder 31.

Member 35 is slotted at 37 and a knife blade 38 is statically fitted therethrough. By suitably adjusting the fixture 21 and tool holder 30, knife 38 may be disposed with respect to roll 12 at any desired inclination thereto or distance therefrom. Corresponding parts including knife 42 are present on tool holder 31.

In use, tool holders 30, 31 are positioned preferably so that the longitudinal axes of knives 38, 42 are perpendicular to a tangent to roll 12. Further, tool holders 30, 31 are positioned a suitable distance from roll 12 so that the cutting edges of knives 38, 42 make incisions in rubber 39 which may be disposed on the surface of roll 12.

By adjusting tool holders 30, 31 properly, the depth of the incision of knives 38, 42 in rubber 39 may be such that the rubber is cut clear through and may then be parted from the rubber remaining on roll 12 as illustrated in FIG. 1.

The distance of knives 38, 42 from roll 12 should preferably be set to just cut rubber 39 and not dig into the surface of roll 12 as it turns for obvious reasons. In this respect, knives 38, 42 are suitably made from metal of a hardness slightly less than the metal of roll 12, such as a hardness equal to Rockwell 50–55.

The leading cutting edges 40, 40' of knives 38, 42 respectively, should be kept quite sharp to cleanly cut rubber 39. In addition, the rear cutting sides 41, 41' (side faced away from roll 12) of knives 38, 42 respectively, are preferably arcuate to permit rubber 39 that has just been cut to flow smoothly over knives 38, 42.

In use, knives 38, 42 are suitably positioned to make about a 15° angle with the longitudinal axis of roll 12. When employing a standard two roll rubber mill, this provides a wing-type cut on each side of the rubber strip or camelback ribbon 43 parted from rubber 39 of about 1¼" in width.

From the foregoing it will be clear that the method for making camelback ribbon provided by the present invention comprises, broadly, shaping mixed rubber compounding ingredients into a sheet of rubber, and then cutting strips from said sheet by making spaced parallel longitudinal incisions in said sheet so that the surfaces of said sheets exposed by the incisions lie in preselected converging planes.

Although the foregoing invention has been described in some detail by way of illustration and example for purposes of clarity of understanding, it is understood that certain changes and modifications may be practiced within the spirit of the invention as limited only by the scope of the appended claims.

What is claimed is:

1. An adjustable attachment for a rubber mixing mill for cutting wing die shaped camelback ribbon therefrom comprising, in combination, a rubber mixing mill having a plurality of rolls, an arbor mounted on said mill parallel to and relatively closely spaced from the terminal roll thereof, a pair of cutting fixtures slidably mounted on said arbor for positioning along said arbor at preselected points, means for holding said fixtures at preselected points, a tool holder cooperating with each fixture and releasably locked thereto, said tool holder being movable toward and away from said terminal roll when released from said fixture, a knife supported by part of each tool holder oriented toward the surface of said terminal roll, the part of each tool holder supporting said knives being rotatable with respect to the remainder of each tool holder whereby the inclination of each blade with respect to the longitudinal axis of said terminal roll may be varied.

2. An adjustable attachment for a rubber mixing mill in accordance with claim 1 wherein said tool holders are adapted to support said knives so that the longitudinal axes of said knives are perpendicular to a tangent to said terminal roll.

3. An adjustable attachment for a rubber mixing mill in accordance with claim 1 wherein the rear cutting side of each knife is arcuate.

4. An adjustable attachment for a mixing mill for cutting wing die shaped camelback ribbon therefrom comprising, in combination, a rubber mixing mill having a plurality of rolls, an arbor mounted on said mill parallel to and relatively closely spaced from the terminal roll thereof, a pair of cutting fixtures mounted on said arbor for positioning along said arbor at preselected points, means for holding said fixtures at preselected points, a knife associated with each of said fixtures, each of said fixtures including a knife holder supporting the knives on their associated fixtures oriented toward the surface of said terminal roll, each of said knife holders being adjustable to position its supported knife at a preselected inclination to the longitudinal axis of said terminal roll.

5. An adjustable attachment for a rubber mixing mill for cutting wing die shaped camelback ribbon therefrom comprising, in combination, a rubber mixing mill having a plurality of rolls, an arbor mounted on said mill parallel to and relatively closely spaced from the terminal roll thereto, a pair of cutting fixtures mounted on said arbor for positioning along said arbor at preselected points, means for holding said fixtures at preselected points, a knife associated with each of said fixtures, each of said fixtures including a knife holder supporting the knives on their associated fixtures oriented toward the surface of said terminal roll, each of said knife holders being operable to position its supported knife toward and away from said terminal roll and at a preselected inclination to the longitudinal axis thereof.

References Cited in the file of this patent

UNITED STATES PATENTS

| | | |
|---|---|---|
| 1,255,098 | Lewis | Jan. 29, 1918 |
| 1,289,485 | Lewis | Dec. 31, 1918 |
| 1,731,537 | Krause | Oct. 15, 1929 |
| 1,743,302 | Allen | Jan. 14, 1930 |
| 2,593,282 | Engler | Apr. 15, 1952 |